United States Patent
Kim et al.

(10) Patent No.: US 10,624,495 B2
(45) Date of Patent: Apr. 21, 2020

(54) IGNITION DEVICE USING PELLET FUEL

(71) Applicants: Jin Seung Kim, Incheon (KR); Sun Young Lee, Seongnam-si (KR)

(72) Inventors: Jin Seung Kim, Incheon (KR); Sun Young Lee, Seongnam-si (KR)

(*) Notice: Subject to any disclaimer, the term of this patent is extended or adjusted under 35 U.S.C. 154(b) by 142 days.

(21) Appl. No.: 15/576,879

(22) PCT Filed: May 27, 2016

(86) PCT No.: PCT/KR2016/005606
§ 371 (c)(1),
(2) Date: Nov. 27, 2017

(87) PCT Pub. No.: WO2016/190692
PCT Pub. Date: Dec. 1, 2016

(65) Prior Publication Data
US 2018/0146824 A1 May 31, 2018

(30) Foreign Application Priority Data
May 27, 2015 (KR) .................. 10-2015-0073956

(51) Int. Cl.
*A47J 37/07* (2006.01)
*F24B 15/00* (2006.01)
(Continued)

(52) U.S. Cl.
CPC ......... *A47J 37/0786* (2013.01); *A47J 37/079* (2013.01); *A47J 37/0754* (2013.01);
(Continued)

(58) Field of Classification Search
CPC ................................ F24B 15/005; F23Q 7/02
See application file for complete search history.

(56) References Cited

U.S. PATENT DOCUMENTS 3,046,381 A * 7/1962 Olswang ............... F24B 15/005
219/270
5,000,100 A * 3/1991 Mendive .................. F23B 1/30
110/101 C
(Continued)

FOREIGN PATENT DOCUMENTS

JP 2012073012 A 4/2012
KR 100916111 B1 9/2009
(Continued)

OTHER PUBLICATIONS

International Search Report of PCT/KR2016/005606, dated Sep. 2, 2016.

*Primary Examiner* — David J Laux
(74) *Attorney, Agent, or Firm* — STIP Law Group, LLC

(57) ABSTRACT

The present invention relates to an ignition device using pellet fuel capable of quickly igniting and burning the pellet fuel, which is supplied into an inner container, and including a container part having the inner container in which the pellet fuel is accommodated while being dropped therein and an outer container of which an upper part is integrally provided with an outer side of the inner container, a heater bar provided at a lower part of the container part and configured to ignite the pellet fuel while being heated by electrical energy, and a cover provided at an inner bottom of the inner container and configured to cover the heater bar.

10 Claims, 7 Drawing Sheets

(51) Int. Cl.
    *F23Q 7/22*             (2006.01)
    *F23Q 7/02*             (2006.01)
    *F23G 5/24*             (2006.01)
    *F23B 30/00*           (2006.01)
    *F23B 40/08*           (2006.01)
    *F23G 5/10*             (2006.01)
    *F23B 40/00*           (2006.01)
    *F23L 5/02*             (2006.01)
    *F23Q 7/04*             (2006.01)

(52) U.S. Cl.
    CPC .................. *F23B 1/26* (2013.01); *F23B 1/28* (2013.01); *F23B 1/38* (2013.01); *F23B 40/00* (2013.01); *F23B 40/08* (2013.01); *F23G 5/10* (2013.01); *F23G 5/245* (2013.01); *F23L 5/02* (2013.01); *F23Q 7/02* (2013.01); *F23Q 7/04* (2013.01); *F23Q 7/22* (2013.01); *F24B 15/005* (2013.01); *F23G 2205/121* (2013.01); *F23G 2209/261* (2013.01); *F23G 2900/50206* (2013.01)

(56) References Cited

U.S. PATENT DOCUMENTS

| | | | | |
|---|---|---|---|---|
| 5,488,943 | A * | 2/1996 | Whitfield | F23B 1/00 |
| | | | | 126/152 B |
| 6,223,737 | B1 * | 5/2001 | Buckner | F23B 1/38 |
| | | | | 110/108 |
| 7,886,675 | B2 * | 2/2011 | Johnson | F23B 40/08 |
| | | | | 110/250 |
| 9,140,448 | B2 * | 9/2015 | Freeman | F23K 3/16 |
| 10,030,870 | B2 * | 7/2018 | Arikan | F23H 1/02 |
| 10,077,904 | B2 * | 9/2018 | Grant | F23B 50/12 |
| 2008/0060632 | A1 | 3/2008 | Leverty | |
| 2010/0116182 | A1 * | 5/2010 | Chodacki | F23B 50/12 |
| | | | | 110/233 |
| 2011/0083593 | A1 * | 4/2011 | Hunter | F23G 5/16 |
| | | | | 110/346 |
| 2017/0176018 | A1 * | 6/2017 | Traeger | F24B 15/005 |

FOREIGN PATENT DOCUMENTS

KR     1020090119121 A     11/2009
KR     1020100052585 A     5/2010

\* cited by examiner

--Prior Art--

IGNITION DEVICE USING PELLET FUEL

CROSS-REFERENCE TO RELATED APPLICATIONS

This application is the U.S. National Phase under 35 U.S.C. § 371 of International Application No. PCT/KR2016/005606 filed on May 27, 2016, which in turn claims the benefit of Korean Application No. 10-2015-0073956, filed on May 27, 2015, the disclosures of which are incorporated by reference into the present application.

TECHNICAL FIELD

The present invention relates to an ignition device using pellet fuel, and more particularly, to an ignition device using pellet fuel that quickly ignites pellet fuel supplied into an inner container and burns the pellet fuel.

BACKGROUND ART

Generally, a combustion system that uses fossil fuels such as gas, coal briquettes, and oil as a main fuel source is being used as a system for roasting food ingredients such as meat and fish. However, problems of the combustion system using fossil fuels, such as wasted energy and environmental pollution, have been highlighted, and there has recently been a demand to replace the combustion system using fossil fuels with a combustion system using an eco-friendly fuel source instead of fossil fuels.

To meet such demand, U.S. Pat. No. 6,223,737 related to a pellet fuel burning device proposes a configuration in which, when corn kernels (100) are fed into an auger device (70), which is rotated by a motor (78) and gear arrangement (79), through a hopper (68), the auger device (70) may deliver the corn kernels (100) to a pellet burner unit (50) disposed in a fire box (30), and air blown through a pressure box (82) may be supplied to the pellet burner unit (50), thereby igniting the corn kernels (100).

However, in the above-described pellet fuel burning device, because sawdust, paper, wood chips, and the like are accumulated in a lower part of the fire box (30) and then a user manually ignites the accumulation, causing the corn kernels (100) to be initially burned, there is a problem in that a long time is taken for the initial burning and it is thus inconvenient.

Also, as the size of the pellet burner unit (50) increases, accumulation of supplied pellet fuel tends to be focused on one spot, and accordingly, there is a problem in that, during heat transfer, the heat transfer is not uniform or the heat transfer is impeded.

DISCLOSURE

Technical Problem

The present invention has been devised to solve the above problems, and an objective of the present invention is to provide an ignition device using pellet fuel in which a heater bar heated by electrical energy is provided at a lower part of an inner container in which pellet fuel is accommodated, a cover is provided at an inner bottom of the inner container and configured to cover the heater bar, and a space portion is formed between the bottom of the inner container and the cover such that pellet fuel is ignited by the heater bar, a heat source is smoothly supplied due to the space portion, and the pellet fuel is ignited within a short time, thereby shortening a cooking time and enhancing ignition efficiency.

Technical Solution

To achieve the above objective, according to an aspect of the present invention, an ignition device using pellet fuel includes a container part having an inner container in which the pellet fuel is accommodated while being dropped therein and an outer container of which an upper part is integrally provided with an outer side of the inner container, a heater bar provided at a lower part of the container part and configured to ignite the pellet fuel while being heated by electrical energy, and a cover provided at an inner bottom of the inner container and configured to cover the heater bar.

According to the present embodiment, a heat supply part configured to supply a heat source to the pellet fuel as the heater bar is fitted thereto may be formed at the inner bottom of the inner container, and a support may be provided at an upper part of the bottom of the inner container so that the cover is seated thereon.

A plurality of supports may be provided at upper parts at both sides of the heat supply part so that the cover is stably seated thereon in a horizontal state.

A heater bar insertion part may be formed in a rear surface of the outer container for the heater bar to be inserted thereinto.

An inner part of the inner container may be wide at a top end and gradually narrow toward the bottom to allow flames to widely spread as the pellet fuel burns due to the heat source of the heater bar.

According to the present embodiment, the heater bar may be provided in the heat supply part of the inner container to be electrically connected thereto and ignite the pellet fuel accommodated in the inner container.

The heater bar may be provided in a stick shape so that the heat source is evenly transmitted to both sides of the inner container and heat supply efficiency is enhanced.

According to the present embodiment, the cover may include a seating part formed at an inner surface thereof so that the cover is able to be mounted on an outer side of the support of the inner container.

The cover may be mounted on the outer side of the support, and the bottom of the inner container and a lower surface of the cover may be spaced apart from each other such that a space portion is formed therebetween.

Advantageous Effects

According to the ignition device using pellet fuel of the present invention configured as described above, a heat supply part from which a heater bar is exposed is formed at an inner bottom of an inner container in which the pellet fuel is accommodated, and a cover is provided to cover the heater bar and allow a space portion to be formed such that the pellet fuel accommodated in the inner container is ignited, and the pellet fuel is ignited within a short time, thereby maximizing thermal efficiency.

Further, the cover is provided at an upper part of the heat supply part of the inner container, thereby improving durability and convenience in use of the ignition device using pellet fuel.

DESCRIPTION OF REFERENCE NUMERALS OF MAIN PARTS IN THE DRAWINGS

Figure 1:
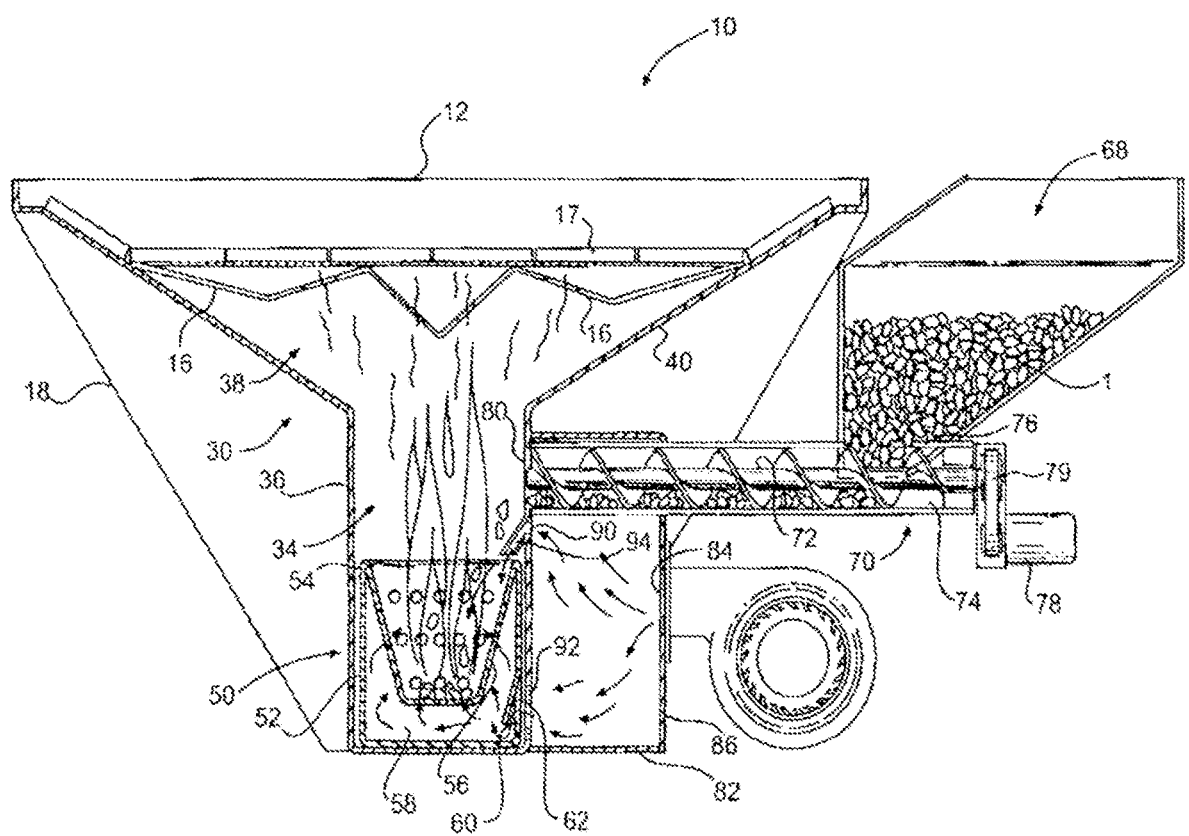
FIG. 1 is a cross-sectional view illustrating an inner configuration of a conventional combustion system using pellet fuel.

100: Housing 200: Combustion chamber
300: Ignition device 310: Container part
311: Outer container 311a: Air circulation space
311b: Blowhole 311c: Heater bar insertion part
312: Inner container 312a: Through-hole
312b: Heat supply part 313: Support
320: Heater bar 330: Cover
331: Seating part 332: Space portion
400: Pellet supply part 500: Air blowing part
600: Roasting part 700: Oil collecting bin
800: Pellet fuel

MODES OF THE INVENTION

Hereinafter, an embodiment of the present invention will be described in detail below with reference to the accompanying drawings.

Figure 2:
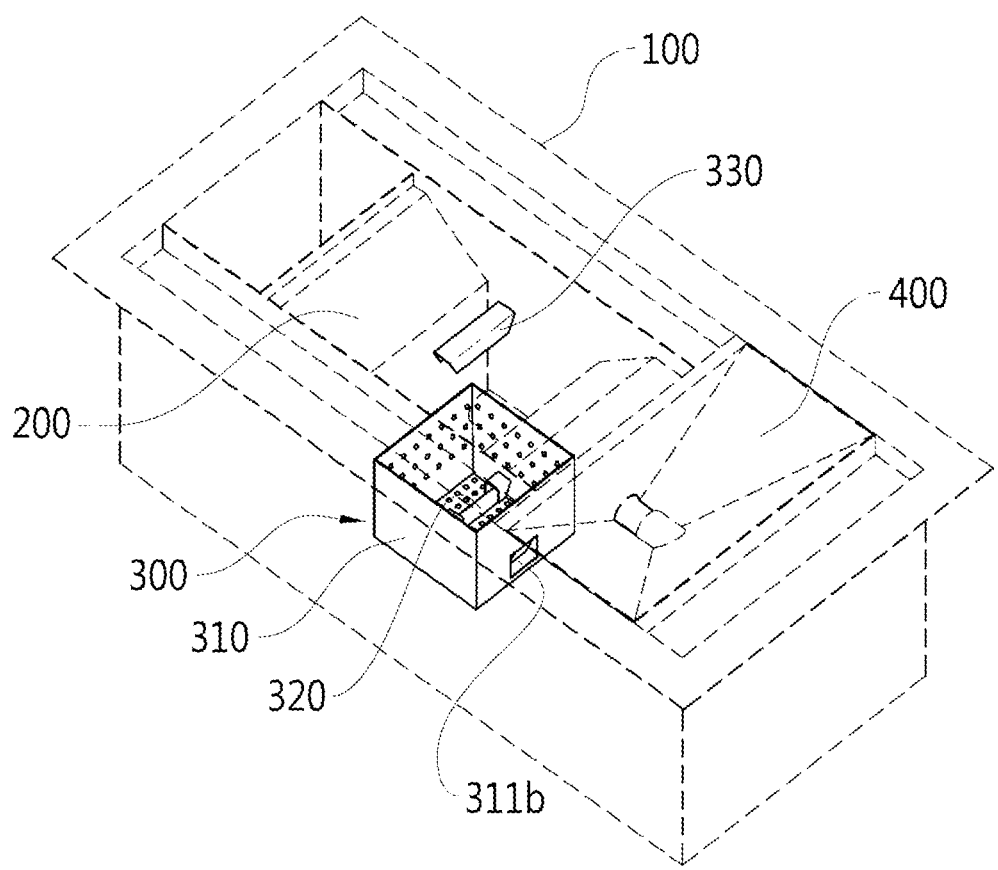
FIG. 2 is a perspective view illustrating a combustion system using pellet fuel according to the present invention.
Figure 3:
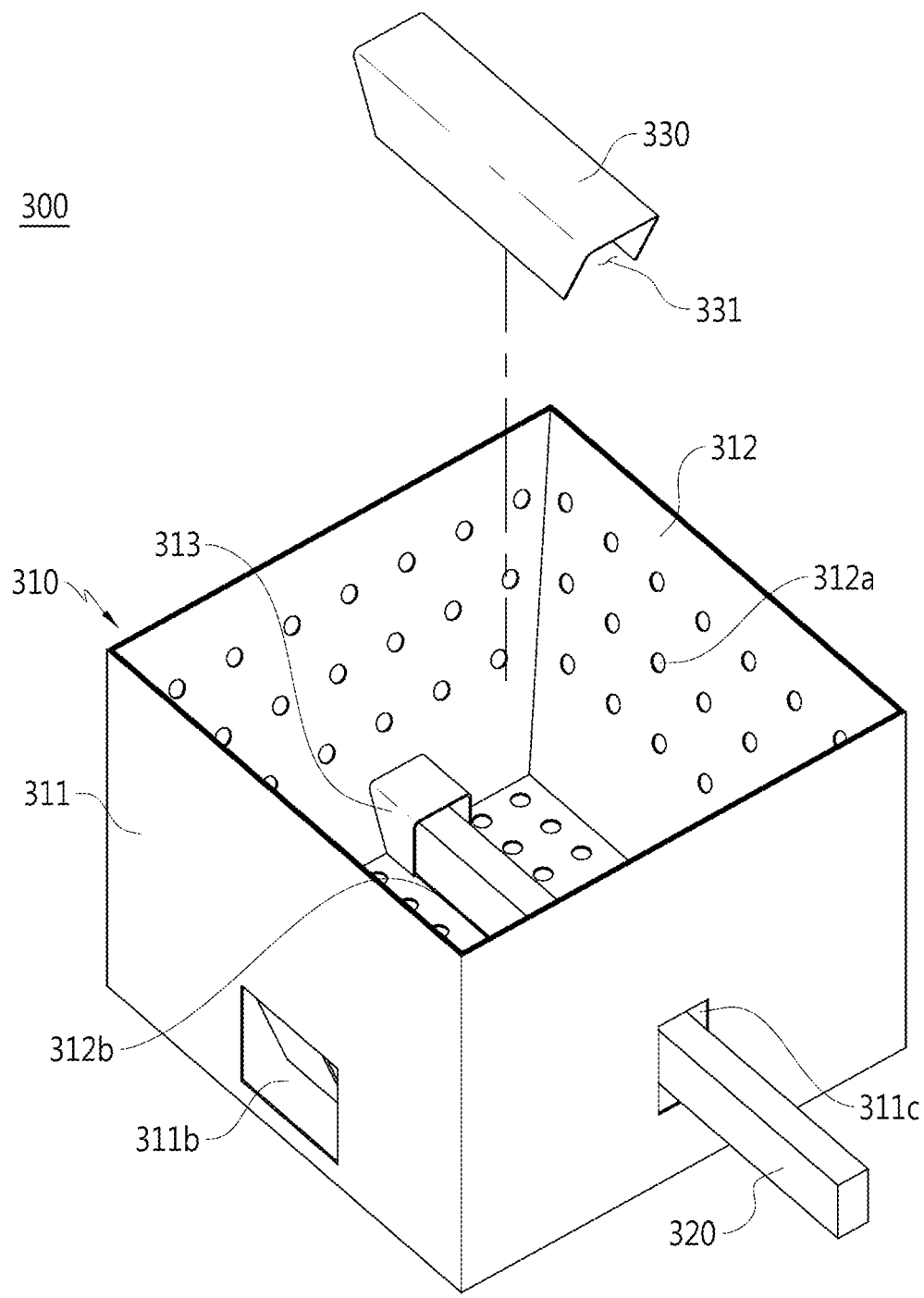
FIG. 3 is an exploded perspective view illustrating an ignition device using pellet fuel according to the present invention.
Figure 4:
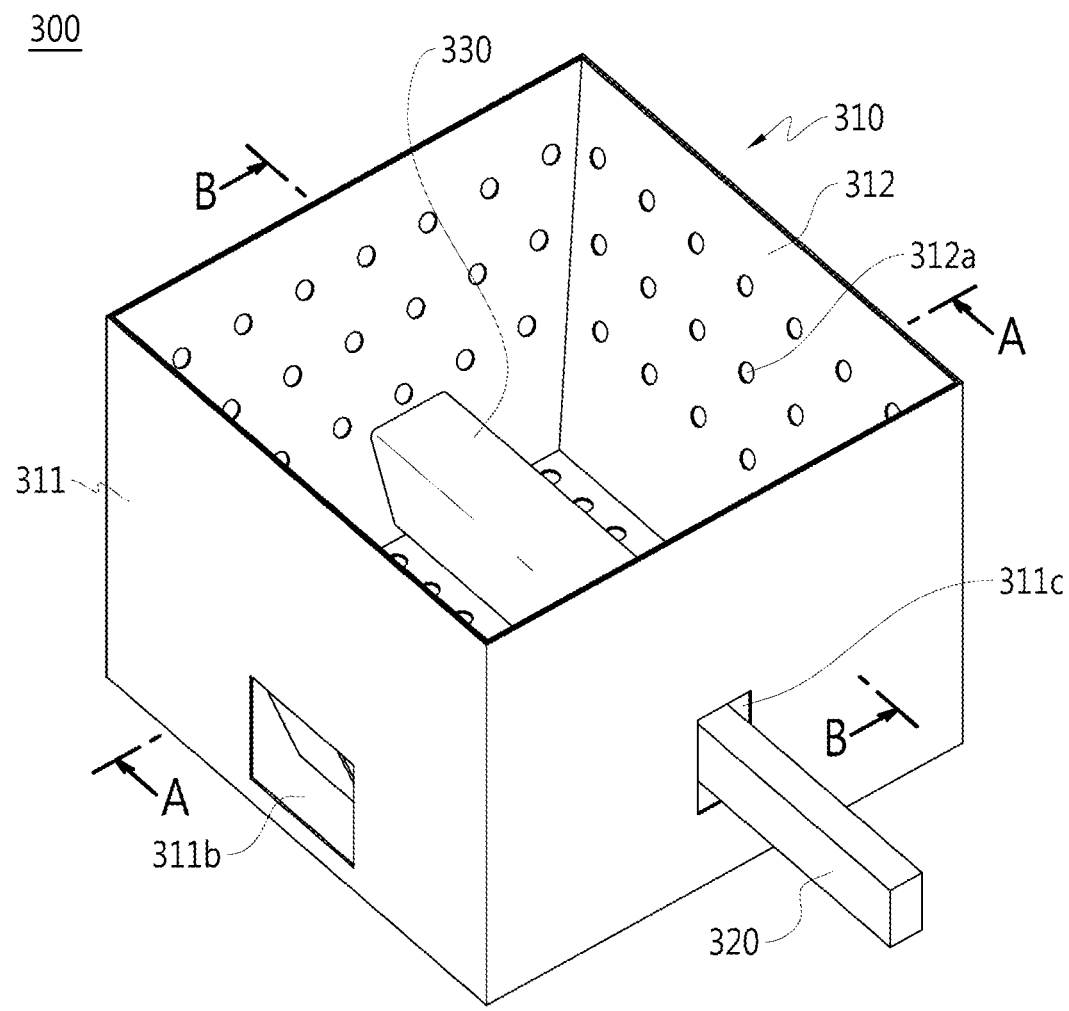
FIG. 4 is a perspective view illustrating the ignition device using pellet fuel according to the present invention.
Figure 5:
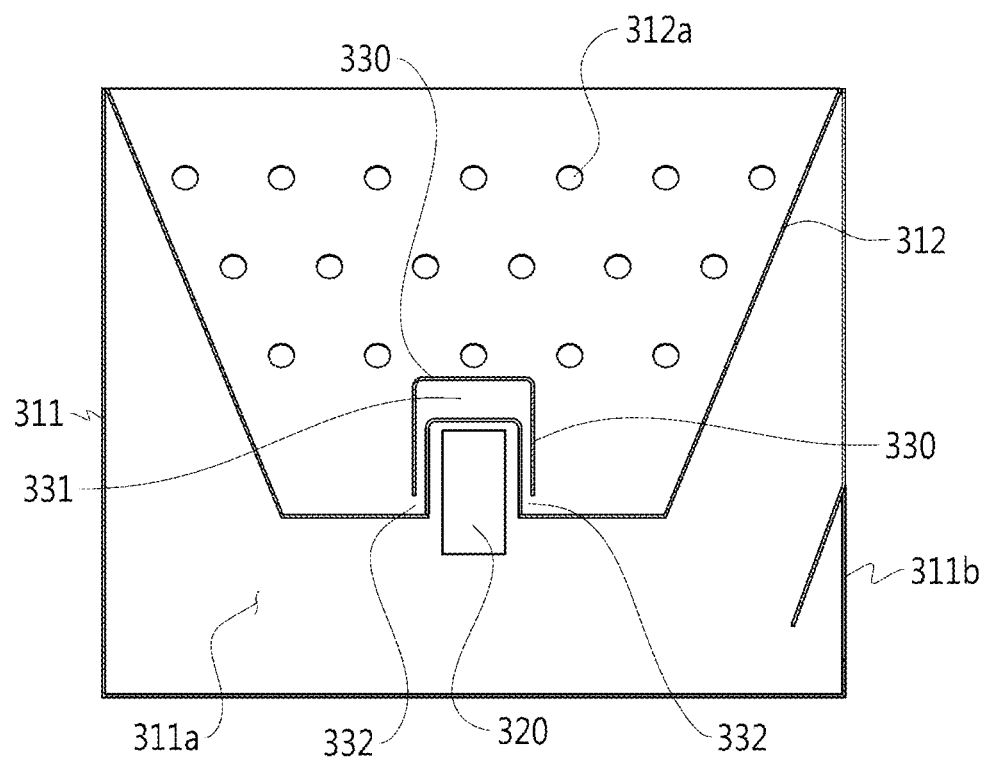
FIG. 5 is a cross-sectional view taken along line "A-A" of FIG. 4.
Figure 6:
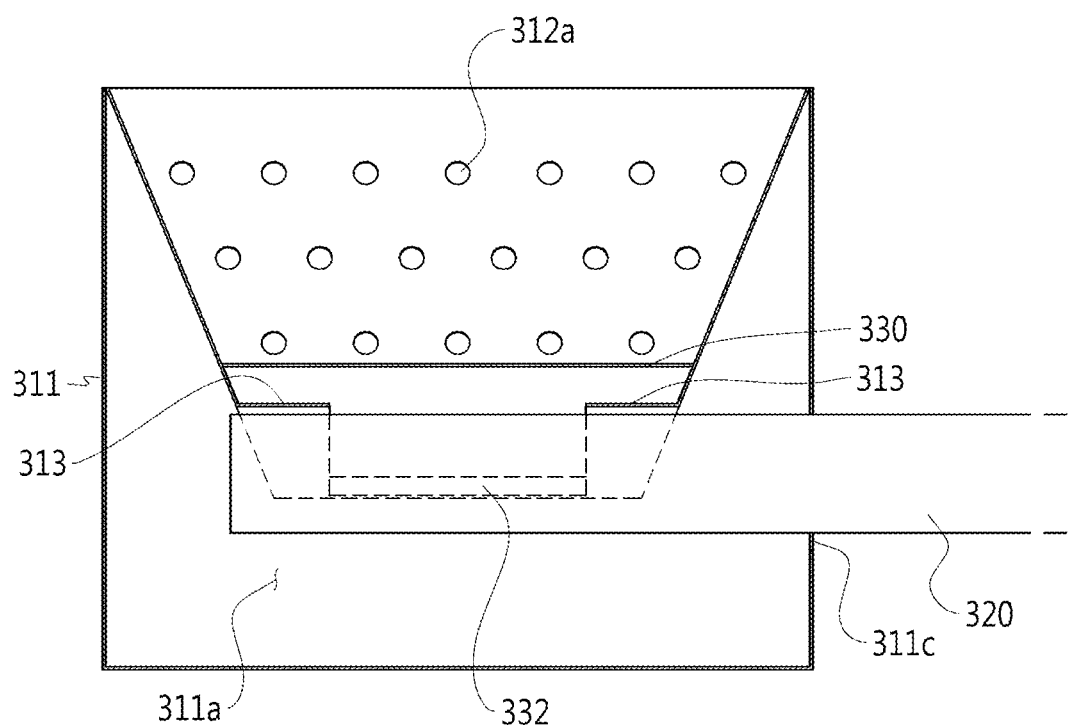
FIG. 6 is a cross-sectional view taken along line "B-B" of FIG. 4.
Figure 7:
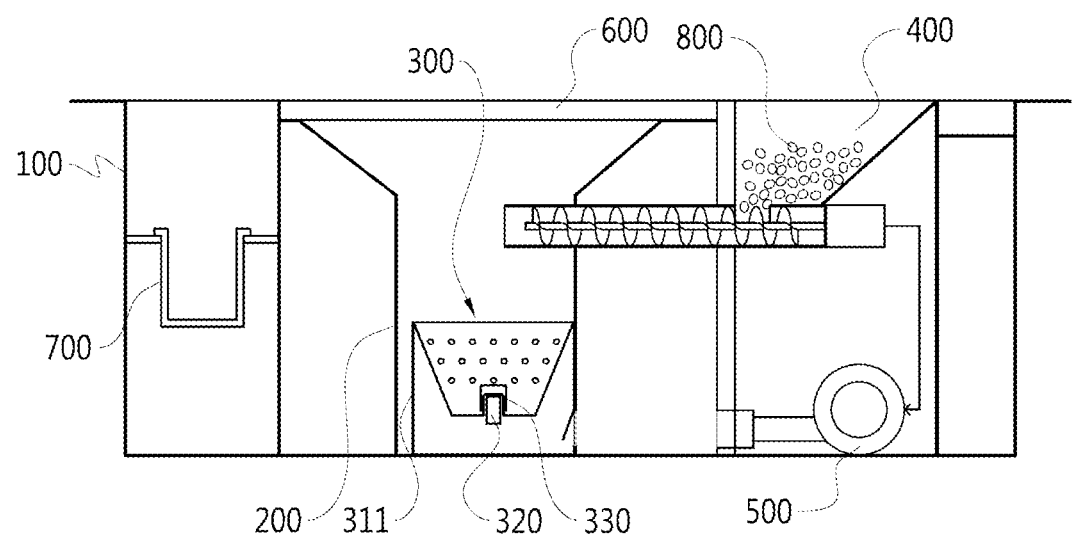
FIG. 7 is a cross-sectional view illustrating a state in which the ignition device using pellet fuel according to the present invention is provided.

FIG. 2 is a perspective view illustrating a combustion system using pellet fuel according to the present invention, FIG. 3 is an exploded perspective view illustrating an ignition device using pellet fuel according to the present invention, FIG. 4 is a perspective view illustrating the ignition device using pellet fuel according to the present invention, FIG. 5 is a cross-sectional view taken along line "A-A" of FIG. 4, FIG. 6 is a cross-sectional view taken along line "B-B" of FIG. 4, and FIG. 7 is a cross-sectional view illustrating a state in which the ignition device using pellet fuel according to the present invention is provided.

As illustrated in FIGS. 2 to 7, a combustion system using pellet fuel 800 according to the present invention includes, as its main components, a housing 100 forming a body, a combustion chamber 200 provided inside the housing 100, a container part 310 provided in the combustion chamber 200 and in which the pellet fuel 800, such as corn kernels, burns, a pellet supply part 400 configured to supply the pellet fuel 800 to the container part 310, an air blowing part 500 configured to blow air to facilitate burning of the pellet fuel 800 supplied to the container part 310, an ignition device 300 configured to receive air from the air blowing part 500 and provide embers in a state in which the pellet fuel 800 is suitable to burn so that initial burning of the pellet fuel 800 occurs, a roasting part 600 provided at an upper part of the combustion chamber 200 and configured to receive heat and cook food such as meat, and an oil collecting bin 700 configured to collect oil from the meat when the meat is being cooked by transmitting heat thereto and allow the oil to be reused as a fuel source.

The ignition device 300 using the pellet fuel 800 according to the present invention includes the container part 310, a heater bar 320, and a cover 330.

According to the present embodiment, the container part 310 includes an outer container 311 to which air is supplied from the air blowing part 500, and an inner container 312 provided inside the outer container 311 and in which the pellet fuel 800 supplied thereto from the pellet supply part 400 is ignited.

The container part 310 includes an air circulation space 311a formed therein, i.e., between the outer container 311 and the inner container 312.

A blowhole 311b configured to allow introduction of outside air by the air blowing part 500 and circulate the air inside the housing 100 to allow the air to be supplied to the air circulation space 311a is formed at a side surface of the outer container 311.

Here, the blowhole 311b is formed to communicate with the air blowing part 500 to facilitate the supply of the outside air into the air circulation space 311a by the air blowing part 500.

A heater bar insertion part 311c is formed at a rear surface of the outer container 311 to allow the heater bar 320 to be inserted into the air circulation space 311a.

The inner container 312 is provided inside the outer container 311, has an upper end part integrally provided with an upper part of the outer container 311, and has a plurality of through-holes 312a formed therein at predetermined intervals to allow outside air introduced into an outer peripheral surface and a lower end surface of the inner container 312 by the air blowing part 500 to be circulated to facilitate ignition of the pellet fuel 800.

That is, the container part 310 is provided in the combustion chamber 200, and the blowhole 311b is formed to communicate with the air blowing part 500 so that outside air is introduced into the air circulation space 311a via the blowhole 311b due to an operation of the air blowing part 500 and is circulated via the through-holes 312a, and ignition of the pellet fuel 800 accommodated in the inner container 312 is facilitated.

A heat supply part 312b configured to supply a heat source into the inner container 312 is formed at the inner bottom of the inner container 312 to ignite the pellet fuel 800.

Supports 313 are provided at an upper part of the bottom of the inner container 312, i.e., an upper part of the heat supply part 312b, such that the plurality of supports 313 are provided at upper parts at both sides of heat supply part 312b.

An inner part of the inner container 312 is provided to be wide at a top end and gradually narrow toward the bottom to allow flames to widely spread as the pellet fuel 800 burns and allow food such as meat to be evenly cooked.

The heater bar 320 heated by electrical energy and configured to ignite the pellet fuel 800 is provided at a lower part of the inner container 312.

The heater bar 320 may be provided in the heat supply part 312b of the inner container 312 via the heater bar insertion part 311c to be electrically connected thereto and ignite the pellet fuel 800 accommodated in the inner container 312.

The heater bar 320 is provided in a stick shape so that the heat source is evenly transmitted to both sides of the inner container 312 and heat supply efficiency is enhanced.

That is, as the heater bar 320 is formed in the stick shape, a high heat source of the heater bar 320 is rapidly transmitted to the pellet fuel 800 that is supplied to both sides of the inner container 312, and the pellet fuel 800 is able to be ignited as quickly as possible.

The cover 330 is provided at the inner bottom of the inner container 312 to cover the heater bar 320.

The cover 330 is provided at the upper part of the heat supply part 312b and seated on the supports 313.

A seating part 331 is formed at an inner surface of the cover 330 to prevent movement of the cover 330 when the cover 330 is seated on the supports 313.

The cover 330 has both side surfaces provided at the plurality of supports 313 that are provided at the bottom of the inner container 312 so that the cover 330 may remain horizontal at the bottom of the inner container 312.

The cover 330 may be provided at the supports 313 such that the bottom of the inner container 312 and the lower surface of the cover 330 are spaced apart from each other, and a space portion 332 is formed therebetween.

That is, a height of the cover 330 is shorter than a height of the support 313 so that the space portion 332 is formed between the inner container 312 and the cover 330.

The space portion 332 is formed at both sides of the cover 330.

Operation states of the ignition device using pellet fuel according to the present invention configured as above will be described below.

The ignition device 300 is provided in the combustion chamber 200 of the housing 100, and the pellet fuel 800 that is supplied into the inner container 312 of the container part 310 via the pellet supply part 400 is ignited by the ignition device 300 and burns.

Here, the pellet fuel 800 accommodated in the pellet supply part 400 is supplied into the inner container 312, heat is transmitted to the pellet fuel 800 accommodated in the inner container 312 as the heater bar 312 is heated by power supplied thereto, and the pellet fuel 800 is ignited.

When the pellet fuel 800 is ignited due to the heating of the heater bar 320, air generated in the air blowing part 500 is supplied into the air circulation space 311a via the blowhole 311b, and the pellet fuel 800 is ignited within the shortest possible time due to the heat source transmitted to the cover 330.

When the cover 330 is provided at the supports 313, the heat supply part 312b and the space portion 332 communicate because the space portion 332 is formed between the inner container 312 and the cover 330, and the heat source generated in the heater bar 320 is smoothly transmitted to the pellet fuel 800.

When the pellet fuel 800 drops from the pellet supply part 400 to the inner container 312, the cover 330 prevents the pellet fuel 800 from dropping below the inner container 312 via the heat supply part 312b of the inner container 312 and allows the pellet fuel 800 to be accommodated in the inner container 312.

Therefore, in the present invention, the heat supply part 312b is formed at the bottom of the inner container 312, the heater bar 320 in the stick shape is provided at the heat supply part 312b, the cover 330 is provided at the supports 313 of the inner container 312, and the space portion 332 is formed between the cover 330 and the bottom of the inner container 312 when the cover 330 covers the heater bar 320 and the heat supply part 312b, thereby allowing the pellet fuel 800 accommodated in the inner container 312 to be ignited and burn within a short time due to the heat source caused by the heater bar 320, the cover 330, and the space portion 332.

The present invention is not limited to the particular exemplary embodiment described above, and one of ordinary skill in the art to which the invention pertains should be able to modify and practice the present invention in various other ways without departing from the gist of the present invention, with such modifications belonging to the scope of the claims below.

The invention claimed is:

1. An ignition device using pellet fuel, the ignition device comprising:
a container part having an inner container in which the pellet fuel is accommodated while being dropped therein and an outer container of which an upper part is integrally provided with an outer side of the inner container;
a heater bar provided at a lower part of the container part and configured to ignite the pellet fuel while being heated by electrical energy; and
a cover provided at an inner bottom of the inner container and configured to cover the heater bar,
wherein the heater bar is partially positioned below a portion of an outer bottom of the inner container, and the cover is spaced apart from the inner bottom of the inner container.

2. The ignition device of claim 1, wherein a heat supply part configured to supply a heat source to the pellet fuel as the heater bar is fitted thereto is formed at the inner bottom of the inner container.

3. The ignition device of claim 1, wherein the inner container part includes a support that protrudes upward from the bottom of the inner container so that the cover is seated thereon.

4. The ignition device of claim 3, wherein a plurality of supports are provided at the inner container so that the cover is stably seated thereon in a horizontal state.

5. The ignition device of claim 3, wherein the cover includes a seating part formed at an inner surface thereof so that the cover is able to be mounted at an outer side of the support of the inner container.

6. The ignition device of claim 3, wherein the cover is mounted at the outer side of the support, and the bottom of the inner container and a lower surface of the cover are spaced apart from each other such that a space portion is formed therebetween.

7. The ignition device of claim 1, wherein a heater bar insertion part is formed in a surface of the outer container for the heater bar to be inserted thereinto.

8. The ignition device of claim 1, wherein an inner part of the inner container is wide at a top end and gradually narrows toward the bottom to allow flames to widely spread as the pellet fuel burns due to the heat source of the heater bar.

9. The ignition device of claim 1, wherein the heater bar is provided in the heat supply part of the inner container to be electrically connected thereto and ignite the pellet fuel accommodated in the inner container.

10. The ignition device of claim 1, wherein the heater bar is provided in a stick shape so that the heat source is evenly transmitted to both sides of the inner container and heat supply efficiency is enhanced.

* * * * *